United States Patent
Ding et al.

(10) Patent No.: US 9,798,405 B2
(45) Date of Patent: Oct. 24, 2017

(54) TOUCH DISPLAY PANEL STRUCTURE, METHOD FOR FORMING THE SAME, AND TOUCH DISPLAY DEVICE

(71) Applicants: SHANGHAI TIANMA MICRO-ELECTRONICS CO., LTD., Shanghai (CN); TIANMA MICRO-ELECTRONICS CO., LTD, Shenzhen (CN)

(72) Inventors: Hong Ding, Shanghai (CN); Lingxiao Du, Shanghai (CN); Feng Lu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 60 days.

(21) Appl. No.: 15/011,874

(22) Filed: Feb. 1, 2016

(65) Prior Publication Data
US 2016/0291757 A1    Oct. 6, 2016

(30) Foreign Application Priority Data
Apr. 1, 2015    (CN) .......................... 2015 1 0152692

(51) Int. Cl.
*G06F 3/041* (2006.01)
*G06F 3/044* (2006.01)
(Continued)

(52) U.S. Cl.
CPC ...... *G06F 3/0412* (2013.01); *G02F 1/136286* (2013.01); *G06F 3/044* (2013.01);
(Continued)

(58) Field of Classification Search
USPC .......... 345/173, 205, 214, 92, 212; 349/123; 257/71, 72; 216/17
See application file for complete search history.

(56) References Cited

U.S. PATENT DOCUMENTS

2009/0102774 A1* 4/2009 Hattori ............. G02F 1/133382 345/92
2009/0109386 A1* 4/2009 Chen ................. G02F 1/133707 349/123
(Continued)

FOREIGN PATENT DOCUMENTS

CN    102411238    10/2010

*Primary Examiner* — Thuy Pardo
(74) *Attorney, Agent, or Firm* — Alston & Bird LLP

(57) ABSTRACT

A touch display panel structure, a method for forming the touch display panel structure, and a touch display device are provided. The touch display panel structure includes: a substrate, scan lines each including a plurality of scan line segments, touch electrode lines each disposed at an interval between adjacent scan line segments; a first dielectric layer and data lines; a second dielectric layer and a first interconnection structure; a first via hole through the first dielectric layer and the second dielectric layer; a third dielectric layer a common electrode layer; a second via hole through the first dielectric layer and the second dielectric layer; and a plurality of third via holes through the third dielectric layer, wherein each touch electrode is connected to a touch electrode line via the second via hole and the third via hole.

18 Claims, 13 Drawing Sheets

(51) Int. Cl.
*G02F 1/1362* (2006.01)
*G02F 1/1333* (2006.01)

(52) U.S. Cl.
CPC ............... *G02F 1/13338* (2013.01); *G06F 2203/04103* (2013.01); *G06F 2203/04111* (2013.01)

(56) References Cited

U.S. PATENT DOCUMENTS

| | | | |
|---|---|---|---|
| 2010/0103121 A1* | 4/2010 | Kim | G06F 3/044 345/173 |
| 2010/0253674 A1* | 10/2010 | Sugimoto | G09G 3/3233 345/214 |
| 2012/0068200 A1 | 3/2012 | Oh et al. | |
| 2013/0249888 A1* | 9/2013 | Sugimoto | G09G 3/3233 345/212 |
| 2015/0108482 A1* | 4/2015 | Kim | H01L 27/3276 257/71 |
| 2015/0273833 A1* | 10/2015 | Yang | B41J 2/06 216/17 |
| 2016/0087020 A1* | 3/2016 | Chwu | G02F 1/133305 257/72 |
| 2016/0276423 A1* | 9/2016 | Kubota | H01L 27/326 |

\* cited by examiner

TOUCH DISPLAY PANEL STRUCTURE, METHOD FOR FORMING THE SAME, AND TOUCH DISPLAY DEVICE

CROSS REFERENCE TO RELATED APPLICATIONS

This application claims priority to Chinese Patent Application No. 201510152692.6, titled "TOUCH DISPLAY PANEL STRUCTURE, METHOD FOR FORMING THE SAME, AND TOUCH DISPLAY DEVICE", filed with the Chinese State Intellectual Property Office on Apr. 1, 2015, which is incorporated by reference in its entirety herein.

BACKGROUND OF THE DISCLOSURE

Display devices are widely used in various fields due to advantages such as a small size, a light weight and low radiation. Some display devices in conventional art have touch functions. Generally, a common electrode in the display device is divided into multiple blocks, and common electrodes in each block share a touch electrode. In the conventional art, a lead is disposed for each touch electrode to enable each touch electrode to output signals.

Referring to FIG. 1, an array substrate in a Mid-Com structure in the conventional art is taken as an example. The array substrate in the Mid-Com structure includes a gate layer 2 formed on a substrate 1, an insulating layer 3 on the gate layer 2, a transistor structure 5, a signal line 4 for connecting the transistor structure 5, and an insulating layer 6 on the insulating layer 3, a common electrode 10 on the insulating layer 6, a pixel electrode 9 on an insulating layer 8, and a signal line 11 on the insulating layer 8 and electronically connected to the common electrode 10, wherein the signal line 11 is configured to be used as a signal wiring in a touch period of the common electrode 10. That is, in the conventional art, an additional step is required to form the signal line 11 as a touch electrode line.

Other structures (e.g., Top-Com structure) in conventional art also require the additional step to form the above signal lines. Hence, the entire manufacture process is complicated, and cost for the manufacture is high.

BRIEF SUMMARY OF THE DISCLOSURE

A touch display panel structure, a method for forming the touch display panel structure, and a touch display device are provided according to the present disclosure, to simplify the manufacturing process of a display device.

A touch display panel structure for touch sensing and displaying is provided according to the present disclosure, to address the problems mentioned above, and the touch display panel structure includes:

a substrate;

a plurality of scan lines extending in a first direction on the substrate, wherein each scan line includes a plurality of scan line segments arranged in the first direction, with an interval between adjacent scan line segments;

a plurality of touch electrode lines disposed in the same layer as the plurality of scan lines on the substrate, wherein the touch electrode lines extend in a second direction, each touch electrode line is disposed at the interval between adjacent scan line segments, and the touch electrode line does not contact the adjacent scan line segments;

a first dielectric layer disposed on the plurality of scan lines and the plurality of touch electrode lines;

a plurality of data lines disposed on the first dielectric layer, wherein the plurality of data lines are disposed correspondingly above the touch electrode lines;

a second dielectric layer disposed on the plurality of data lines;

a plurality of first interconnection structures disposed on the second dielectric layer;

a plurality of first via holes through the first dielectric layer and the second dielectric layer, wherein the first interconnection structure connects the adjacent scan line segments via the first via hole;

a third dielectric layer disposed on the plurality of first interconnection structures;

a common electrode layer disposed on the third dielectric layer;

a plurality of second via holes through the first dielectric layer and the second dielectric layer; and a plurality of third via holes through the third dielectric layer, wherein each touch electrode is connected to one of the plurality of touch electrode lines via the second via hole and the third via hole.

Compared with the conventional art, the advantageous effect of the technical solution of the present disclosure includes: the scan lines extending in the first direction are disposed in the same layer as the touch electrode lines on the substrate, wherein each scan line includes a plurality of scan line segments electronically connected to each other through the first interconnection structures, and the touch electrode line is connected to the common electrode via at least the first via hole. In this way, the scan lines and the touch electrode lines can be formed in one step during the manufacture process, rather than in the conventional art where the touch electrode lines are formed in an additional step, thereby simplifying the process step and saving the mask.

In addition, the data lines are formed right above the touch electrode lines, and the projections of the data lines in a direction perpendicular to the substrate overlap the touch electrode lines. In this way, the data lines help shield the touch electrode lines against interference signals, that is, the data lines help reduce the crosstalk suffered by the touch electrode lines.

It is also provided a touch display device including the above touch display panel structure according to the present disclosure.

As described above, the touch display device may simplify the manufacturing process and reduce the cost.

It is also provided a method for forming a touch display panel structure according to the present disclosure, the method for forming a touch display panel structure includes:

providing a substrate;

forming a plurality of scan lines extending in a first direction and a plurality of touch electrode lines extending in a second direction on the substrate, wherein, each scan line includes a plurality of scan line segments arranged in the first direction, with an interval between the adjacent scan line segments, each touch electrode line is disposed at the interval between adjacent scan line segments, and the touch electrode line does not contact the adjacent scan line segments;

forming a first dielectric layer on the plurality of scan lines and the plurality of touch electrode lines;

forming a plurality of data lines on the first dielectric layer, each of the plurality of data lines are disposed above the plurality of touch electrode lines and correspondingly to the plurality of touch electrode lines;

forming a second dielectric layer on the plurality of data lines;

forming a plurality of first via holes and a plurality of second via holes through the first dielectric layer and the second dielectric layer;

forming a plurality of first interconnection structures on the second dielectric layer, each of the first interconnection structures connects adjacent scan line segments via the first via hole;

forming a third dielectric layer on the plurality of first interconnection structures;

forming a plurality of third via holes through the third dielectric layer; and forming a common electrode layer on the third dielectric layer, wherein the common electrode layer includes a plurality of touch electrodes separated from each other, each touch electrode is connected to one of the plurality of touch electrode lines via the second via hole and the third via hole.

Compared with the fact in the conventional art that the touch electrode lines are formed in an additional step, the scan lines and the touch electrode lines can be formed in one step according to the method for forming a touch display panel structure in the present disclosure, thus achieving the effects of simplifying the process step, reducing the cost and improving the manufacturing efficiency. In addition, the data lines are formed right above the touch electrode lines, and projections of the data lines in a direction perpendicular to the substrate overlap the touch electrode lines. In this way, the data lines help shield the touch electrode lines against interference signals, that is, the data lines help reduce the crosstalk suffered by the touch electrode lines.

DETAILED DESCRIPTION OF THE DISCLOSURE

For clarity of the above object, features and advantages of the present disclosure, particular embodiments of the present disclosure are illustrated below in detail in conjunction with the accompanying drawings.

As described in the background, in the conventional art, touch electrode lines for connecting a common electrode are formed in an additional step to achieve a touch control function, which leads to the results that the process step and cost are increased and the manufacturing efficiency is reduced.

In view of the above-described problems, it is provided a method for forming an array substrate according to an embodiment of the present disclosure. Reference is made to FIG. 2 to FIG. 18, which are schematic structural diagrams of a touch display panel structure in various steps of the method for forming the touch display panel structure according to an embodiment of the present disclosure.

Figure 2:
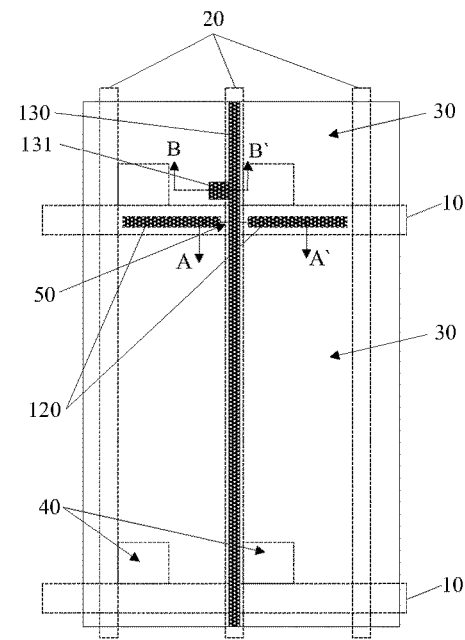
FIG. 2 is a schematic top view of an array substrate of a touch display panel structure according to an embodiment of the present disclosure.
Figure 3:
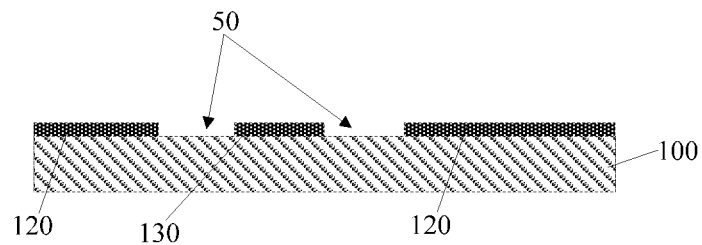
FIG. 3 is a schematic cross sectional view of the array substrate of the touch display panel structure along the A-A' direction in FIG. 2.
Figure 4:
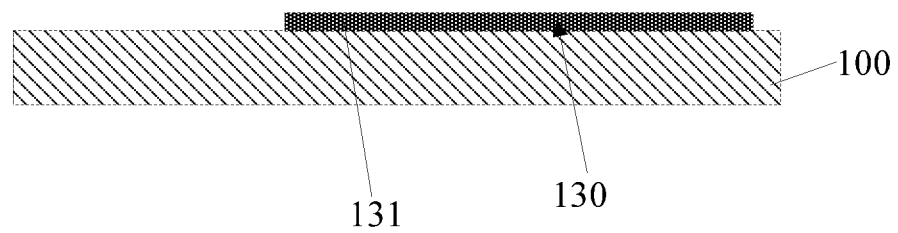
FIG. 4 is a schematic cross sectional view of the array substrate of the touch display panel structure along the B-B' direction in FIG. 2.

Reference is made to FIG. 2 to FIG. 4. FIG. 2 is a schematic top view of an array substrate of a touch display panel structure according to the embodiment. FIG. 3 is a schematic cross sectional view of the array substrate of the touch display panel structure along the A-A' direction in FIG. 2. And FIG. 4 is a schematic cross sectional view of the array substrate of the touch display panel structure along the B-B' direction in FIG. 2. It should be noted that, for clarity, merely a part of the structure (e.g., a scan line segment 120 and a touch electrode line 130 included in a scan line) formed on the substrate 100 is shown while other parts of the touch display panel structure are not shown in FIG. 2, which is not intended to limit the scope of the present disclosure.

Firstly, the substrate 100 is provided, which is a basic carrier for various components formed subsequently. Providing the substrate 100 is a common technical means by those skilled in the art, which is not described herein.

In the present embodiment, the substrate 100 includes a region 10 for forming scan lines, a region 20 for forming touch electrode lines and a region 40 for forming transistors. The region 10 for forming the scan lines and the region 20 for forming the touch electrode lines intersect to enclose a region 30 for forming a pixel electrode array in a subsequent step.

In the embodiment, the substrate 100 may be a glass substrate and is not limited herein.

Then, a plurality of scan lines extending in a first direction and a plurality of touch electrode lines 130 extending in a second direction are formed on the substrate 100. Each of the plurality of scan lines includes a plurality of scan line segments 120 arranged in the first direction, with an interval 50 formed between adjacent scan line segments 120.

Each of the plurality of touch electrode lines 130 is disposed at the interval 50 between the adjacent scan line segments 120, and the touch electrode line 130 does not contact the adjacent scan line segments 120.

The advantageous effect of disposing the touch electrode lines 130 and the scan lines in the same layer lies in that the scan lines and the touch electrode lines 130 may be formed in one step during the manufacturing process, rather than the fact in conventional art that the touch electrode lines 130 are formed in an additional step, thereby simplifying the process step, saving the mask and reducing the cost.

In addition, in the embodiment, the touch electrode line 130 further includes a projecting portion 131, wherein the projecting portion 131 is wider than other parts of the touch electrode line 130 (referring to FIG. 4). The projecting portion 131 is configured to be connected to a common electrode in a subsequent step, which is described in detail subsequently.

In the embodiment, the scan lines and the touch electrode lines 130 may be formed by a method as follows:

A first conductive material layer is deposited on the substrate 100;

Particularly, in the embodiment, the first conductive material layer may be formed by metal material. This is merely an example and not intended to limit the material of the first conductive material layer herein.

A first photoresist layer is formed on the first conductive material layer;

A first mask with a pattern is provided. The first photoresist layer is exposed through the first mask to form the pattern in the first photoresist layer, and a part of the first conductive material layer is uncovered owing to the pattern in the first photoresist layer.

By taking the first photoresist layer with the formed pattern as an etching mask, the uncovered part of the first conductive material layer is etched and removed, and the remaining part of the first conductive material layer forms the scan lines and the touch electrode lines 130.

As can be seen, the scan lines and the touch electrode lines 130 may be formed by using only one first mask in the present disclosure, which can achieve an effect of saving the mask compared with the fact in the conventional art that the scan lines and the touch electrode lines are formed respectively.

Figure 5:
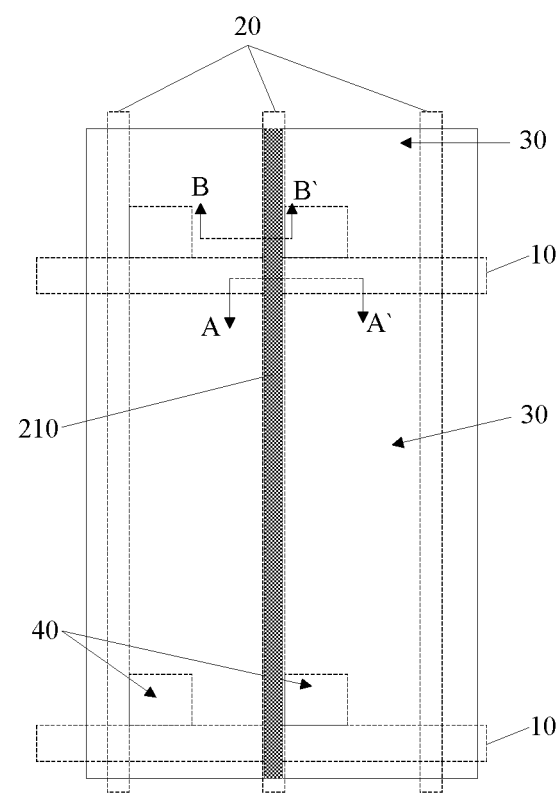
FIG. 5 is a schematic top view of the array substrate of the touch display panel structure after data lines are formed according to an embodiment of the present disclosure.
Figure 6:
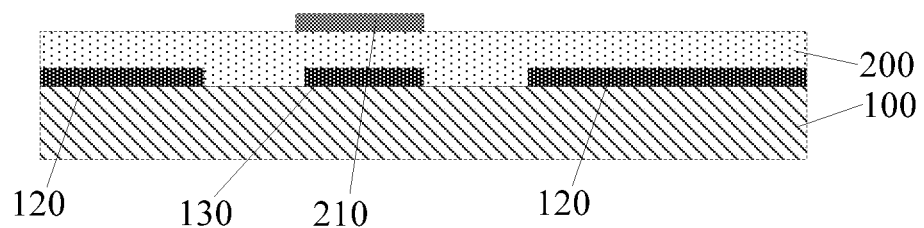
FIG. 6 is a schematic cross sectional view of the array substrate of the touch display panel structure along the A-A' direction in FIG. 5.
Figure 7:
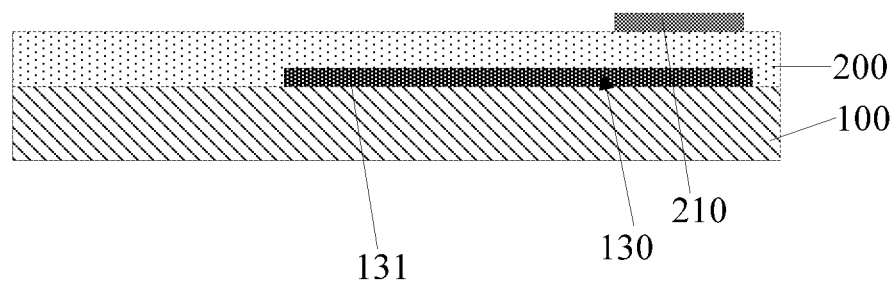
FIG. 7 is a schematic cross sectional view of the array substrate of the touch display panel structure along the B-B' direction in FIG. 5.

After the scan lines and the touch electrode lines 130 are formed, reference is made to FIG. 5 to FIG. 7. FIG. 5 is a schematic top view of the array substrate 100 of the touch display panel structure after data lines 210 are formed according to the embodiment. FIG. 6 is a schematic cross sectional view of the array substrate of the touch display panel structure along the A-A' direction in FIG. 5. And FIG. 7 is a schematic cross sectional view of the array substrate of the touch display panel structure along the B-B' direction in FIG. 5. Similarly, for clarity, merely a part of the touch display panel structure (e.g. data lines 210) formed on the substrate 100 is shown while other parts of the touch display panel structure are not shown in these figures, which is not intended to limit the scope of the present disclosure.

A first dielectric layer 200 is formed on the substrate 100 and above the scan lines and the touch electrode lines 130.

After the first dielectric layer 200 is formed, the data lines 210 are formed on the first dielectric layer 200, each of the data lines 210 is disposed correspondingly above the touch electrode line 130, the projection of the data line 210 in a direction perpendicular to the substrate 100 overlaps the corresponding touch electrode line 130.

The data lines 210 may shield the touch electrode lines 130 against interference signals from other structures, that is, the data lines 210 may reduce the crosstalk suffered by the touch electrode lines 130.

Figure 8:
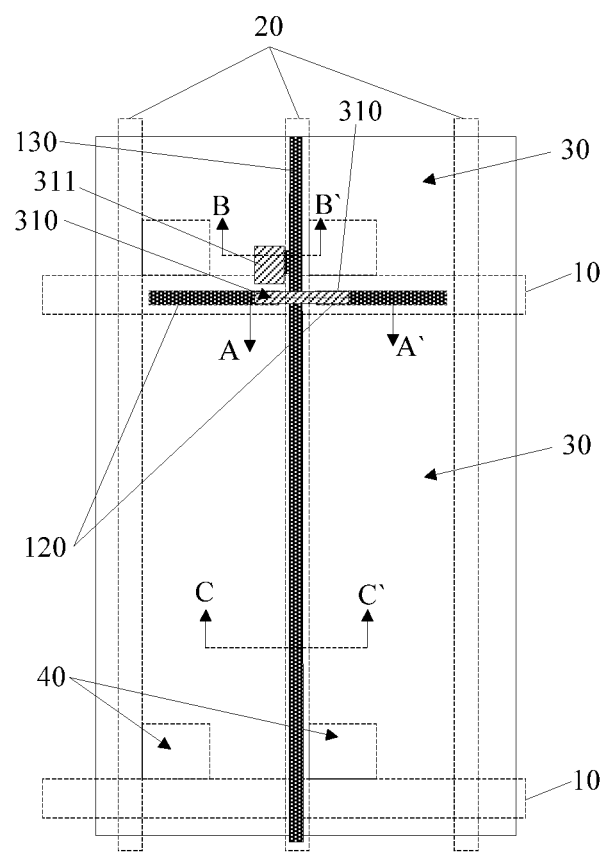
FIG. 8 is a schematic top view of the substrate after first interconnection structures are formed according to an embodiment of the present disclosure.
Figure 9:
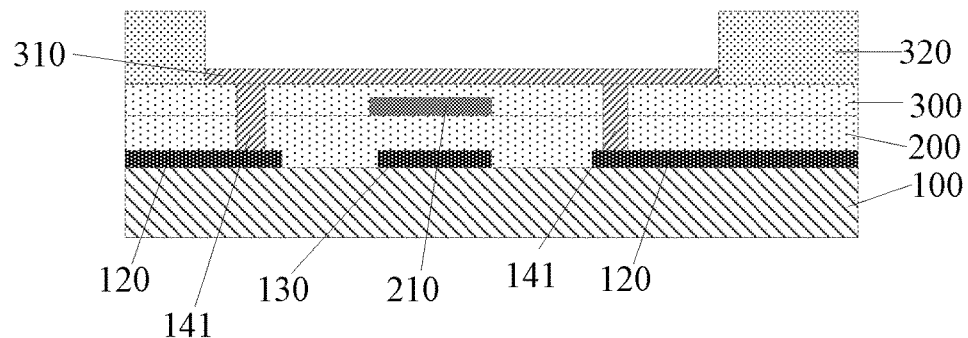
FIG. 9 is a schematic cross sectional view of the array substrate of the touch display panel structure along the A-A' direction in FIG. 8.
Figure 10:
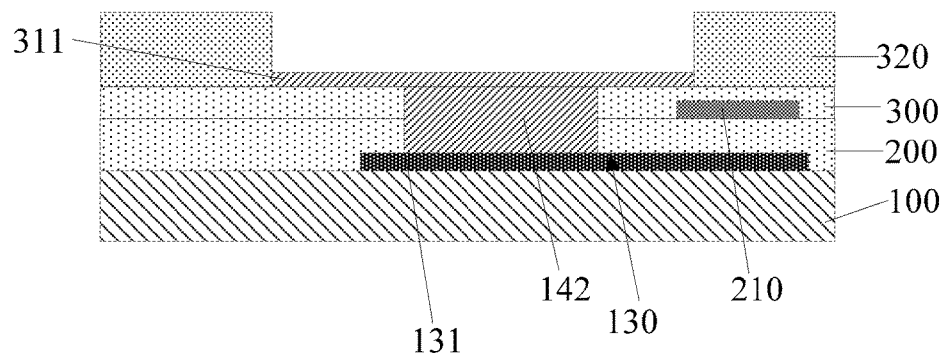
FIG. 10 is a schematic cross sectional view of the array substrate of the touch display panel structure along the B-B' direction in FIG. 8.
Figure 11:
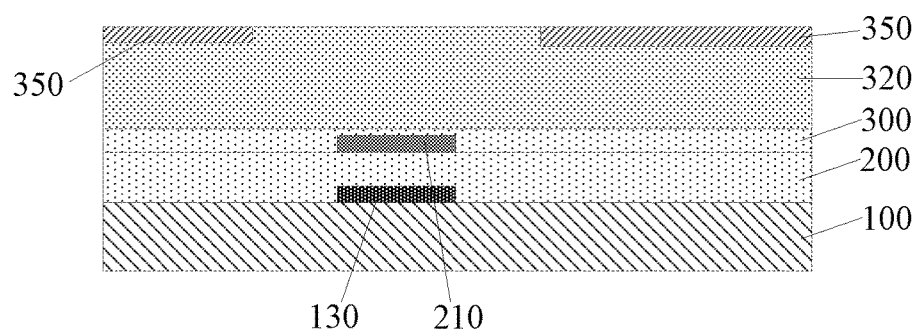
FIG. 11 is a schematic cross sectional view of the array substrate of the touch display panel structure along the C-C' direction in FIG. 8.

After the data lines 210 are formed, a second dielectric layer 300 is formed on the first dielectric layer 200 and above the data lines 210. Reference is made to FIG. 8 to FIG. 11, FIG. 8 is a schematic top view of the array substrate of touch display panel structure after first interconnection structures 310 are formed according to the embodiment. FIG. 9 is a schematic cross sectional view of the array substrate of the touch display panel structure along the A-A' direction in FIG. 8. FIG. 10 is a schematic cross sectional view of the array substrate of the touch display panel structure along the B-B' direction in FIG. 8. And FIG. 11 is a schematic cross sectional view of the array substrate of the touch display panel structure along the C-C' direction in FIG. 8.

After the second dielectric layer 300 is formed, first via holes 141 and second via holes 142 through the first dielectric layer 200 and the second dielectric layer 300 are formed.

The first via hole 141 is configured for electronically connecting the first interconnection structure 310 formed later and the scan line segments 120 of the scan lines. The position of the first via hole 141 corresponds to that of the scan line segment 120 of the scan line. Particularly, the first via hole 141 is located in the first dielectric layer 200 and the second dielectric layer 300 and is right above the scan line segments 120, so that the first interconnection structure 310 formed later may connect the scan line segments 120 via the first via holes 141.

The second via hole 142 is configured for the connection between the touch electrode in the common electrode layer and the touch electrode line 130, which is described in detail in the following process.

An organic layer 320 is formed on the second dielectric layer 300 after the first via holes 141 and the second via holes 142 are formed. The organic layer 320 has a pattern owing to which a part of the second dielectric layer 300 is exposed, wherein the first interconnection structures 310 are formed on the exposed part of the second dielectric layer 300. The organic layer 320 may improve the flatness of the surface of the substrate 100. Because of the different structures of the various layers on the surface of the substrate 100, unevenness of the surface of the substrate 100 may be significant so as to effect the forming of subsequent layers. The organic layer 320 may reduce the unevenness of the surface due to the good performance of organic materials in shape preserving and coverage.

It should be noted that forming the organic layer 320 is only an embodiment of the present disclosure. Whether it is necessary to form the organic layer 320 is not limited herein.

After the organic layer 320 is formed, the first interconnection structure 310 is formed on the part of the second dielectric layer 300 exposed through interspaces of the pattern of the organic layer 320. Two ends of the first interconnection structure 310 are respectively connected to two adjacent scan line segments 120 via the first via hole 141, so that the scan line segments 120 are electronically connected to each other. A first interconnection structure 310 is shown in FIG. 8, wherein the first interconnection structure 310 spans the interval between the two adjacent scan line segments 120 and the touch electrode lines 130 disposed at the intervals, the adjacent scan line segments 120 are electronically connected to each other through the two ends of the first interconnection structure 310.

The touch display panel structure according to the embodiment further includes a conductive underlay 311 disposed in the same layer as the first interconnection structures 310 and insulated from the first interconnection structures 310. The conductive underlay 311 is deposited on the touch electrode line 130 via the second via hole 142 and is configured to electronically connect the common electrode formed later and the touch electrode line 130 on the first dielectric layer 200.

The embodiment further includes forming a pixel electrode array. A touch display panel structure of FFS structure is formed in the embodiment. That is, the pixel electrode array is in a different layer from the common electrode layer. The common electrode layer is above the pixel electrode array in the touch display panel structure according to the embodiment.

In the embodiment, since the organic layer 320 is formed on the second dielectric layer 300, the pixel electrode array is formed on the organic layer 320.

Figure 1:
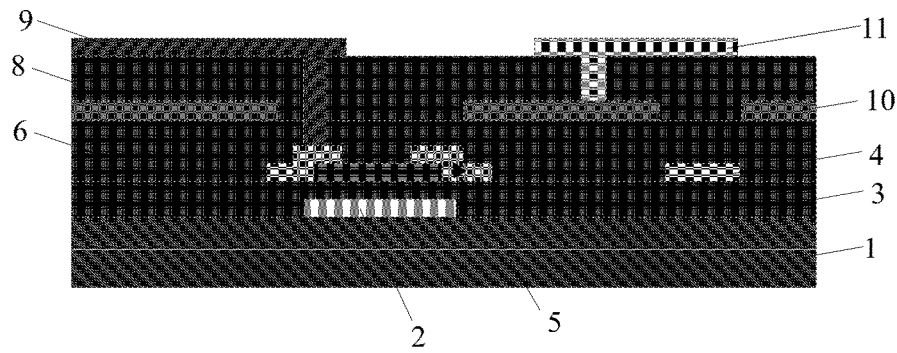
FIG. 1 is a schematic structural diagram of an array substrate in conventional art.

In an embodiment of the present disclosure, a pixel electrode array 350 (referring to FIG. 1) is formed in the same layer as the first interconnection structures 310 on the second dielectric layer 300. In order to save the manufacture step, the pixel electrode array 350 and the first interconnection structures 310 may be formed in one step as follows:

A second conductive material layer is formed on the second dielectric layer 300;

A second photoresist layer is formed on the second conductive material layer;

A second mask with a pattern is provided. The second photoresist layer is exposed through the second mask to form the pattern in the second photoresist layer, and a part of the second conductive material layer is uncovered owing to the pattern in the second photoresist layer.

By taking the second photoresist layer with the formed pattern as an etching mask, the uncovered part of the second conductive material layer is removed by etching, and the remaining part of the second conductive material layer forms the first interconnection structure 310 and the pixel electrode array 350.

The first interconnection structures 310 and the pixel electrode array 350 may be formed in the above steps by using only one second mask, a step is saved and the cost is reduced as compared with the conventional art.

In the embodiment, indium tin oxide may be used to form both the material of the pixel electrode array 350 and the material of the first interconnection structures 310. However, it is merely an example and is not intended to limit the scope of the present disclosure.

Figure 12:
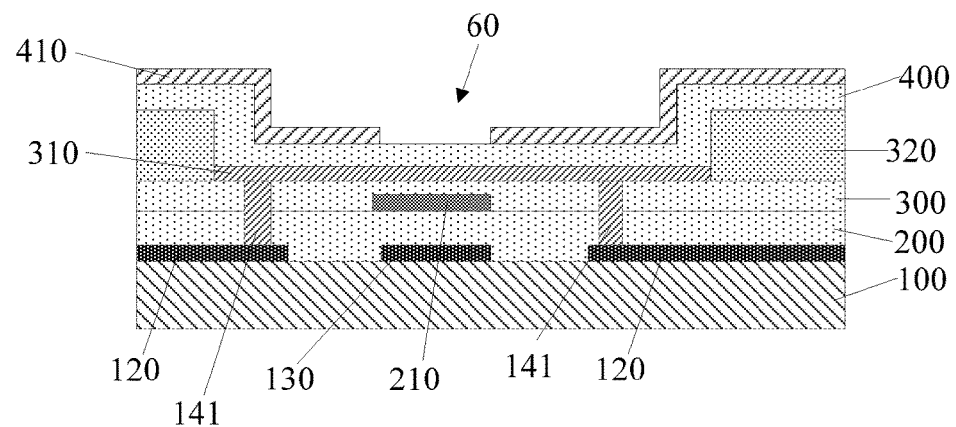
FIG. 12 is a schematic cross sectional view of the array substrate of the touch display panel structure along the A-A' direction in FIG. 8 after a common electrode layer is formed.
Figure 13:
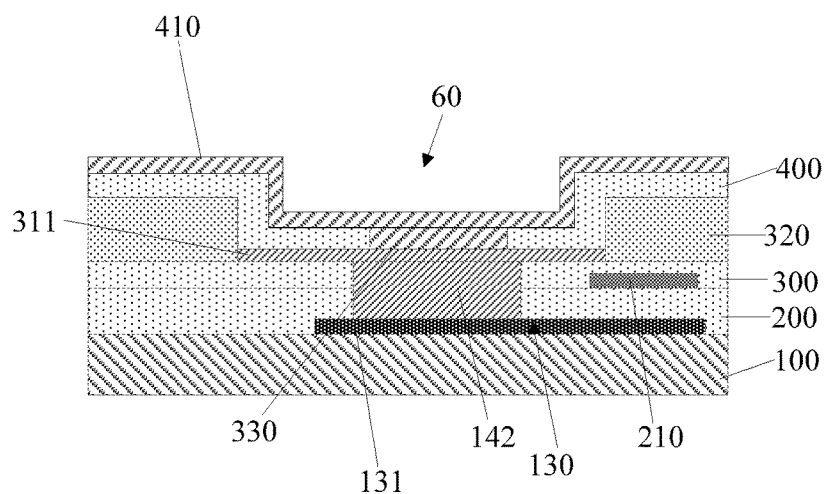
FIG. 13 is a schematic cross sectional view of the array substrate of the touch display panel structure along the B-B' direction in FIG. 8 after the common electrode layer is formed.
Figure 14:
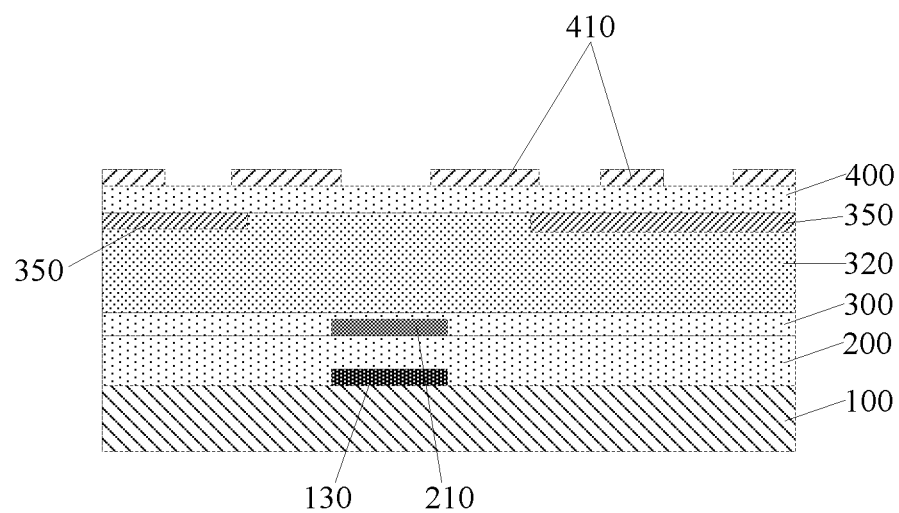
FIG. 14 is a schematic cross sectional view of the array substrate of the touch display panel structure along the C-C' direction in FIG. 8 after the common electrode layer is formed.

Reference is made to FIG. 12 to FIG. 14. Based on FIG. 9, FIG. 12 is a schematic cross sectional view of the array substrate of the touch display panel structure along the A-A' direction in FIG. 8 after a common electrode layer 410 is formed. Based on FIG. 10, FIG. 13 is a schematic cross sectional view of the array substrate of the touch display panel structure along the B-B' direction in FIG. 8 after a common electrode layer 410 is formed. Based on FIG. 11, FIG. 14 is a schematic cross sectional view of the array substrate of the touch display panel structure along the C-C' direction in FIG. 8 after a common electrode layer 410 is formed. As described previously, a pixel electrode array 350 is formed in the same layer as the first interconnection structures 310 on the second dielectric layer 300. As mentioned above, the common electrode layer 410 is formed above the pixel electrode array 350 in the embodiment, before which a third dielectric layer 400 is formed on the pixel electrode array 350, the first interconnection structures 310, the organic layer 320 and the conductive underlay 311. The common electrode layer 410 is then formed on the third dielectric layer 400.

Then a third via hole 330 connected to the second via hole 142 is formed in the third dielectric layer 400. The common electrode layer 410 is connected to the touch electrode line 130 via the third via hole 330 and the second via hole 142.

Figure 15:
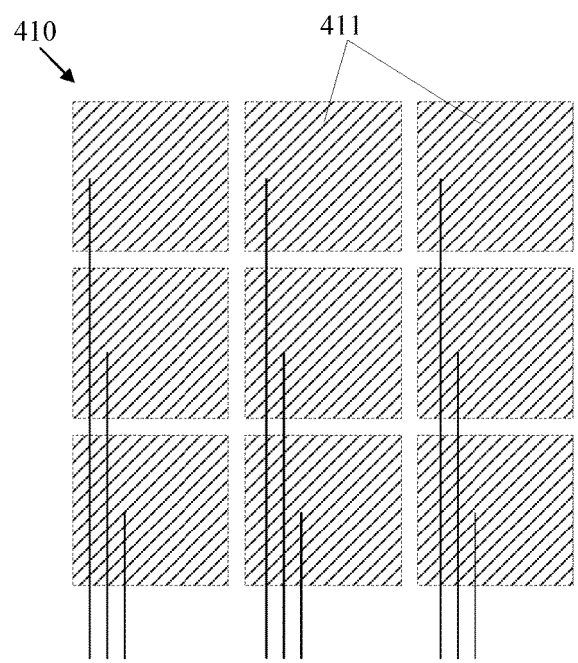
FIG. 15 is a schematic structural diagram of a touch electrode according to an embodiment of the present disclosure.

FIG. 15 is a schematic structural diagram of a touch electrode according to an embodiment after the common electrode layer 410 is formed. The common electrode layer 410 includes a plurality of touch electrodes 411 separated from each other. A common signal is applied to the plurality of touch electrodes 411 during a display period, and a touch signal is applied to the plurality of touch electrodes 411 during a touch period. In a direction perpendicular to the substrate 100, the common electrode layer 410 is disposed oppositely to the pixel electrode array 350, and is electronically connected to the projecting portion 131 of the touch electrode line 130 via the second via hole 142 and the third via hole 330 (and further through the conductive underlay 311 in the embodiment).

Figure 16:
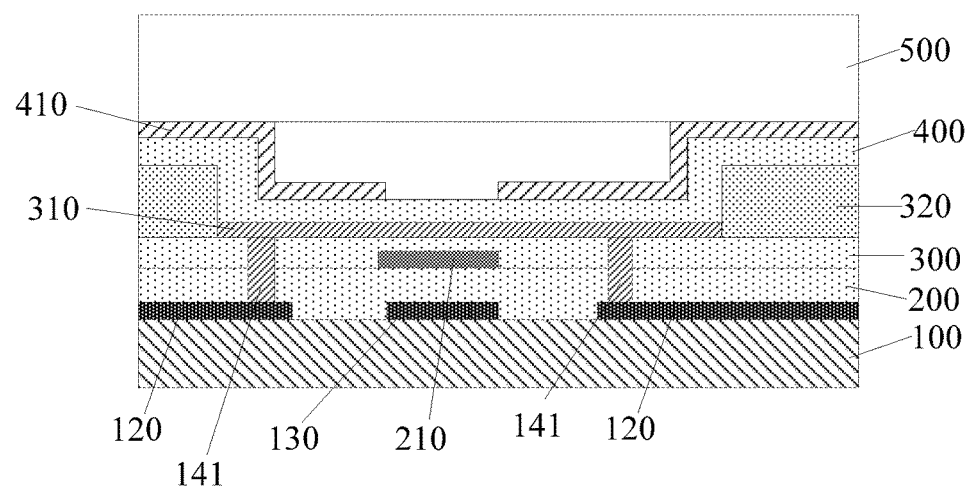
FIG. 16 is a schematic cross sectional view of the touch display panel structure along the A-A' direction in FIG. 8 after a liquid crystal layer is formed.
Figure 17:
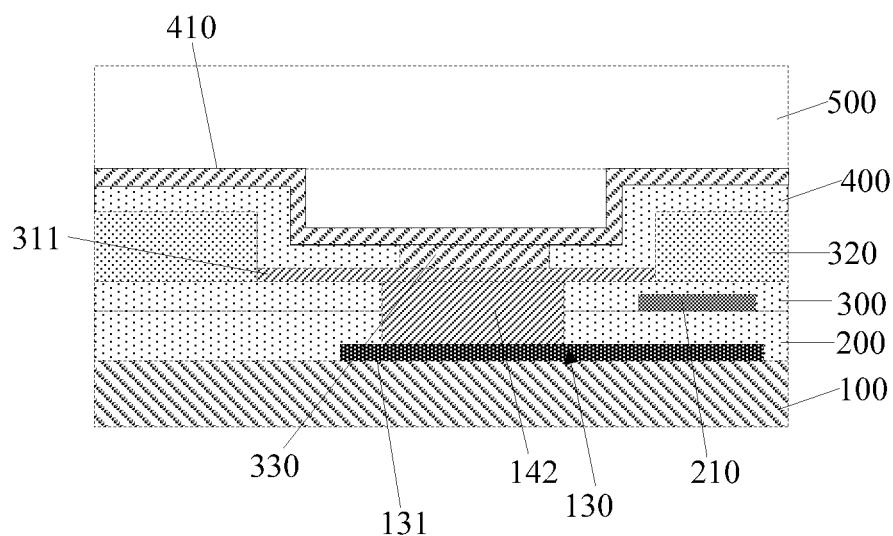
FIG. 17 is a schematic cross sectional view of the touch display panel structure along the B-B' direction in FIG. 8 after the liquid crystal layer is formed.
Figure 18:
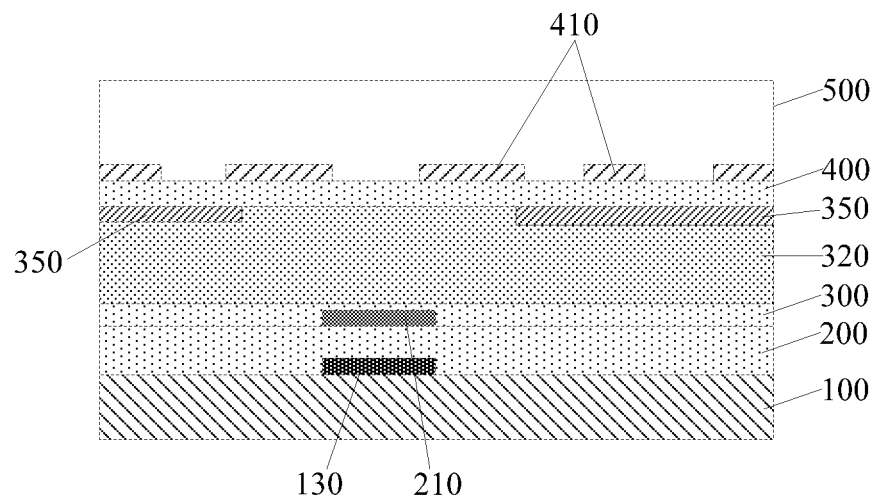
FIG. 18 is a schematic cross sectional view of the touch display panel structure along the C-C' direction in FIG. 8 after the liquid crystal layer is formed.

In the embodiment, after the common electrode layer 410 is formed, a liquid crystal layer is formed on the common electrode layer 410. Reference is made to FIG. 16 to FIG. 18. Based on FIG. 12, FIG. 16 is a schematic cross sectional view of the touch display panel structure along the A-A' direction in FIG. 8 after a liquid crystal layer 500 is formed. Based on FIG. 13, FIG. 17 is a schematic cross sectional view of the touch display panel structure along the B-B' direction in FIG. 8 after a liquid crystal layer 500 is formed. And based on FIG. 14, FIG. 18 is a schematic cross sectional view of the touch display panel structure along the C-C' direction in FIG. 8 after the liquid crystal layer 500 is formed.

The formed liquid crystal layer 500 is above the common electrode layer 410. That is, the touch display panel structure formed in the embodiment is a liquid crystal touch display panel structure.

It should be noted that whether it is necessary to form the liquid crystal layer 500 is not limited herein. In other types of touch display panel structures, such as in a touch display panel structure with OLED as a light source, the liquid crystal layer 500 is not necessary. Therefore, the present disclosure should not be limited to the example herein.

Figure 19:
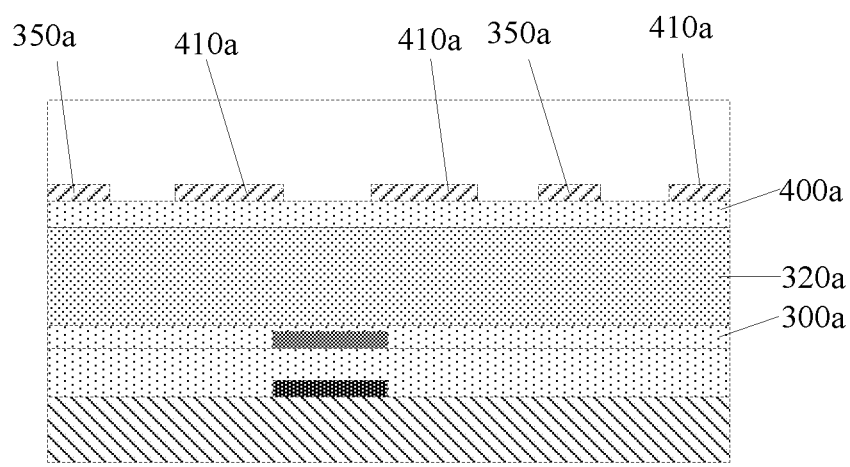
FIG. 19 is a schematic structural diagram of a touch display panel structure formed by a method for forming a touch display panel structure according to an embodiment of the present disclosure.
Figure 20:
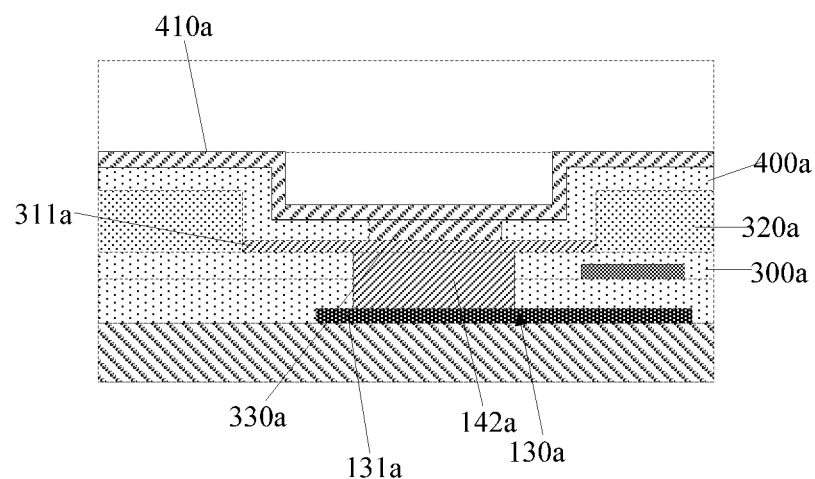
FIG. 20 is a schematic structural diagram of a touch display panel structure formed by the method for forming a touch display panel structure according to another embodiment of the present disclosure.

In addition, the present disclosure is not limited to the above described touch display panel structure of the FFS structure in which the pixel electrode array 350 is not disposed in the same layer with the common electrode layer 410. In other embodiments of the present disclosure, a touch display panel structure of IPS structure may be formed. Reference is made to FIG. 19 and FIG. 20, which are schematic structural diagrams of a touch display panel structure formed by the method for forming a touch display panel structure according to another embodiment of the present disclosure. The touch display panel structure in the present disclosure differentiates from the above described touch display panel structure in that a pixel electrode array 350a is disposed in the same layer as a common electrode layer 410a. Particularly, the process before the step of forming first interconnection structures is the same as that in the above embodiment. After the first interconnection structures are formed and before the common electrode layer 410a is formed, a third dielectric layer 400a is formed on a second dielectric layer 300a, the first interconnection structures (referring to FIG. 20) and an organic layer 320a. And then, a third via hole 330a connected to a second via hole 142a is formed in the third dielectric layer 400a. The pixel electrode array 350a (referring to FIG. 19) is formed on the third dielectric layer 400a, and the common electrode layer 410a is disposed in the same layer as the pixel electrode array 350a. The common electrode layer 410a is electronically connected to a projecting portion 131 of a touch electrode line 130a via the second via hole 142a and the third via hole 330a (and further through a conductive underlay 311a in the embodiment) (which is the same as the above embodiment). That is, the difference between the touch display panel structure in the present disclosure and the above touch display panel structure in the above embodiment lies in that, in this embodiment, the pixel electrode array 350a is disposed in the same layer as the common electrode layer 410a, and the touch display panel structure in the present disclosure is a touch display panel structure of the IPS structure.

In addition, it is provided a touch display panel structure for implementing touch sensing and displaying according to the present disclosure. Reference is made to FIG. 8, and FIG. 16 to FIG. 18, which are schematic structural diagrams of a touch display panel structure according to an embodiment of the present disclosure. FIG. 8 is a schematic top view of the substrate 100 according to the embodiment. FIG. 16 is a schematic cross sectional view of the touch display panel structure along the A-A' direction in FIG. 8. FIG. 17 is a schematic cross sectional view of the touch display panel structure along the B-B' direction in FIG. 8. And FIG. 18 is a schematic cross sectional view of the touch display panel structure along the C-C' direction in FIG. 8. The touch display panel structure according to the embodiment of the present disclosure includes:

a substrate 100, which is a basic carrier for subsequent components formed subsequently. Providing the substrate 100 is a common technical means for those skilled in the art, which is not described in detail herein.

In the present embodiment, the substrate 100 includes a region 10 for forming scan lines, a region 20 for forming touch electrode lines 130 and a region 40 for forming transistors. The region 10 and the region 20 intersect to enclose a region 30 for forming a pixel electrode array and a common electrode layer 410.

In the embodiment, the substrate 100 may be a glass substrate, which is not limited herein.

The touch display panel structure according to the embodiment of the present disclosure further includes: a plurality of scan lines extending in a first direction on the substrate 100, wherein each scan line includes a plurality of scan line segments 120 in the first direction, with an interval 50 formed between adjacent scan line segments 120; and a plurality of touch electrode lines 130 disposed in the same layer as the plurality of scan lines and on the substrate 100, wherein the touch electrode lines 130 extend in a second direction, each touch electrode line 130 is disposed at the interval 50 between the adjacent scan line segments 120, and the touch electrode line 130 does not contact the adjacent scan line segments 120.

In the embodiment, the first direction in which the scan lines extend is perpendicular to the second direction in which the touch electrode lines 130 extend, which is merely an example and is not limited herein.

The advantageous effect of disposing the touch electrode lines 130 and the scan lines in the same layer lies in that the scan lines and the touch electrode lines 130 may be formed in a one process step during the manufacture process, rather than the fact in the conventional art that the touch electrode lines 130 are formed in an additional process step, thereby simplifying the process step and saving the mask.

In the embodiment, the scan lines and the touch electrode lines 130 are formed by the same material. In this way, the scan line and the touch electrode line 130 may be formed by forming one material layer and etching the material layer through one mask, and the process of manufacture can be simplified.

The touch display panel structure according to the embodiment of the present disclosure further includes: a first dielectric layer 200 disposed above the scan lines and the touch electrode lines 130 on the substrate 100; and a plurality of data lines 210 disposed on the first dielectric layer 200. Each of the plurality of data lines 210 is disposed right above the corresponding touch electrode line 130, the projection of the data lines 210 in a direction perpendicular to the substrate 100 overlaps the touch electrode lines 130. The data lines 210 may shield the touch electrode lines 130 against interference signals, that is, the data lines 210 may reduce the crosstalk suffered by the touch electrode lines 130.

The touch display panel structure according to the embodiment of the present disclosure further includes: a second dielectric layer 300 disposed on the first dielectric layer 200 and the data lines 210;

a plurality of first via holes 141 and a plurality of second via holes 142 through the first dielectric layer 200 and the second dielectric layer 300, wherein the second via hole 142 is configured to connect a touch electrode and a touch trace; and a plurality of first interconnection structures 310 disposed on the second dielectric layer 300, wherein the first interconnection structures 310 are electrically connected to the scan line segments 120 via the first via hole 141.

The touch display panel structure according to the embodiment of the present disclosure further includes a conductive underlay 311 disposed in the same layer as the first interconnection structures 310 and insulated from the first interconnection structures 310. The conductive underlay 311 is deposited on the touch electrode line 130 via the second via hole 142, and is configured to electronically connect a common electrode formed later and the touch electrode line 130 on the first dielectric layer 200.

Particularly, in the embodiment, the first interconnection structure 310 spans the interval 50 between the adjacent scan line segments 120, and two ends of the first interconnection structure 310 is respectively connected to the adjacent scan line segments 120 via the first via hole 141, so that the scan line segments 120 are electronically connected.

In the embodiment, an organic layer 320 is formed on the second dielectric layer 300. In the case that the organic layer 320 is formed on the second dielectric layer 300, the first interconnection structures 310 are on the organic layer 320. The organic layer 320 has a pattern between which a part of second dielectric layer 300 is uncovered, and the first interconnection structures 310 are formed on the uncovered part of the second dielectric layer 300.

The organic layer 320 is configured to increase the flatness of the surface of the substrate 100. Because the structures of the various material layers on the surface of the substrate 100 are different, there may be significant unevenness on the surface above the substrate 100, which may affect the forming of other material layers. The organic layer 320 may reduce the unevenness due to the good performance of organic materials in shape preserving and coverage.

It should be noted that forming the organic layer 320 is merely a technical feature in an embodiment of the present disclosure. Whether it is necessary to form the organic layer 320 is not limited herein.

The touch display panel structure according to the embodiment of the present disclosure further includes a third dielectric layer 400 disposed on the first interconnection structures 310. A third via hole 330 is through the third dielectric layer 400 and corresponding to the second via hole 142. In the embodiment, a conductive underlay 311 in the second via hole 142 is exposed through the third via hole 330.

The touch display panel structure according to the embodiment of the present disclosure further includes a common electrode layer 410 on the third dielectric layer 400. The common electrode layer 410 includes a plurality of touch electrodes 411 separated from each other. A common signal is applied to the plurality of touch electrodes 411 during a display period, and a touch signal is applied to the plurality of touch electrodes 411 during a touch period. Each touch electrode 411 in the common electrode layer 410 is electronically connected to the touch electrode line 130 via the second via hole 142 and the third via hole 330.

In addition, the touch display panel structure further includes a pixel electrode array disposed in the same layer as the first interconnection structures 310.

Particularly, in the embodiment, the pixel electrode array and the first interconnection structures 310 are formed by the same material. In this way, the pixel electrode array and the first interconnection structures 310 may be formed by forming one material layer and etching the material layer, and the process step is simplified.

Particularly, the material of the pixel electrode array and the first interconnection structures 310 is indium tin oxide, which is merely an example and is not limited herein.

In the embodiment, a liquid crystal layer 500 is disposed on the common electrode layer 410.

It should be noted that whether it is necessary to form the liquid crystal layer 500 is not limited herein. In other types of touch display panel structures, such as in a touch display panel structure with OLED as a light source, the liquid crystal layer 500 is not necessary.

In addition, the present disclosure is not limited to the above described touch display panel structure of the FFS structure in which the pixel electrode array is not disposed in the same layer as the common electrode layer 410. In other embodiments of the present disclosure, a touch display panel structure of IPS structure may be formed. Reference is made to FIG. 19 and FIG. 20, which are schematic structural diagrams of a touch display panel structure formed by the method for forming a touch display panel structure according to another embodiment the present disclosure. The touch display panel structure in the present embodiment is different from the touch display panel structure in the above embodiment in that, a pixel electrode array 350a is disposed in the same layer as a common electrode layer 410a. A third dielectric layer 400a is formed on a second dielectric layer 300a, first interconnection structures and an organic layer 320a. Both the common electrode layer 410a and the pixel electrode array 350a are disposed on the third dielectric layer 400a. A third via hole 330a connected to a second via hole 142a is formed through the third dielectric layer 400a. The common electrode layer 410a is electronically connected to the touch electrode line via the second via hole 142a and the third via hole 330a (and further through a conductive underlay 311a in the embodiment). In addition, it is provided a touch display device including the touch display panel structure described above. As described above, the touch display device may simplify the process step and reduce the cost.

In summary, according to the touch display panel structure, the method for forming the touch display panel structure, and the touch display device provided in the present disclosure, the scan lines and the touch electrode lines may be formed in one step during the manufacturing process, rather than the fact in conventional art that the touch electrode lines are formed in an additional process step. Thus, the processing step is simplified and the mask is saved, the manufacture efficiency is improved and the cost is reduced.

The present disclosure are described as above, but should not be construed to be limited hereto. Various alternations and modifications may be made to the present disclosure by those skilled in the art without deviation from the scope of the present disclosure. Therefore, the scope of protection of the present disclosure should be consistent with the scope as defined in the appended claims.

What is claimed is:

1. A touch display panel structure, comprising:
a substrate;
a plurality of scan lines extending in a first direction on the substrate, wherein each scan line comprises a plurality of scan line segments arranged in the first direction, with an interval between adjacent scan line segments;
a plurality of touch electrode lines disposed in a same layer as the plurality of scan lines on the substrate, wherein the plurality of touch electrode lines extend in a second direction, each touch electrode line is disposed at the interval between the adjacent scan line segments, and the touch electrode line does not contact the adjacent scan line segments;
a first dielectric layer disposed on both of the plurality of scan lines and the plurality of touch electrode lines;
a plurality of data lines disposed on the first dielectric layer, each of the plurality of data lines are disposed correspondingly above the touch electrode lines;
a second dielectric layer disposed on the plurality of data lines;
a plurality of first interconnection structures disposed on the second dielectric layer;
a plurality of first via holes through the first dielectric layer and the second dielectric layer respectively, wherein the first interconnection structure is connected to adjacent scan line segments via the first via hole;
a third dielectric layer disposed on the plurality of the first interconnection structures;
a common electrode layer disposed on the third dielectric layer;

a plurality of second via holes through the first dielectric layer and the second dielectric layer respectively; and
a plurality of third via holes through the third dielectric layer,
wherein each touch electrode is connected to a touch electrode line via a second via hole and a third via hole.

2. The touch display panel structure according to claim 1, further comprising a conductive underlay disposed in a same layer as the first interconnection structures, wherein the conductive underlay is disposed on the touch electrode line 130 via the second via hole 142.

3. The touch display panel structure according to claim 1, wherein the first interconnection structure spans the interval between the adjacent scan line segments, and two ends of the first interconnection structure are respectively connected to the adjacent scan line segments via the first via hole.

4. The touch display panel structure according to claim 1, further comprising a pixel electrode array disposed in a same layer as the plurality of first interconnection structures.

5. The touch display panel structure according to claim 1, further comprising a pixel electrode array disposed in the same layer as the common electrode layer.

6. The touch display panel structure according to claim 4, wherein the material of the pixel electrode array is the same as the material of the plurality of first interconnection structures.

7. The touch display panel structure according to claim 6, wherein both the material of the pixel electrode array and the material of the plurality of first interconnection structures are indium tin oxide.

8. The touch display panel structure according to claim 1, wherein the first direction in which the scan lines extend is perpendicular to the second direction in which the touch electrode lines extend.

9. The touch display panel structure according to claim 1, wherein the material of the scan line is the same as the material of the touch electrode line.

10. The touch display panel structure according to claim 1, further comprising an organic layer disposed between the second dielectric layer and the plurality of first interconnection structures, wherein the first via holes and the second via holes are further through the organic layer.

11. A touch display device comprising a touch display panel structure, wherein the touch display panel structure comprises:
a substrate;
a plurality of scan lines extending in a first direction on the substrate, wherein each scan line comprises a plurality of scan line segments arranged in the first direction, with an interval between adjacent scan line segments;
a plurality of touch electrode lines disposed in a same layer as the plurality of scan lines on the substrate, wherein the plurality of touch electrode lines extend in a second direction, each touch electrode line is disposed at the interval between the adjacent scan line segments, and the touch electrode line does not contact the adjacent scan line segments;
a first dielectric layer disposed on both of the plurality of scan lines and the plurality of touch electrode lines;
a plurality of data lines disposed on the first dielectric layer, each of the plurality of data lines are disposed correspondingly above the touch electrode lines;
a second dielectric layer disposed on the plurality of data lines;
a plurality of first interconnection structures disposed on the second dielectric layer;
a plurality of first via holes through the first dielectric layer and the second dielectric layer respectively, wherein the first interconnection structure is connected to adjacent scan line segments via the first via hole;
a third dielectric layer disposed on the plurality of the first interconnection structures;
a common electrode layer disposed on the third dielectric layer;
a plurality of second via holes through the first dielectric layer and the second dielectric layer respectively; and
a plurality of third via holes through the third dielectric layer,
wherein each touch electrode is connected to a touch electrode line via a second via hole and a third via hole.

12. A method for forming a touch display panel structure, comprising:
providing a substrate,
forming a plurality of scan lines extending in a first direction and a plurality of touch electrode lines extending in a second direction on the substrate, wherein each scan line comprises a plurality of scan line segments arranged in the first direction, with an interval between adjacent scan line segments, each touch electrode line is disposed at the interval between the adjacent scan line segments, and the touch electrode line does not contact the adjacent scan line segments;
forming a first dielectric layer on both of the plurality of scan lines and the plurality of touch electrode lines;
forming a plurality of data lines on the first dielectric layer, wherein each of the plurality of data lines are disposed correspondingly above the touch electrode lines;
forming a second dielectric layer on the plurality of data lines;
forming a plurality of first via holes and a plurality of second via holes through the first dielectric layer and the second dielectric layer respectively;
forming a plurality of first interconnection structures on the second dielectric layer, wherein each of the first interconnection structures is connected to adjacent scan line segments via the first via hole;
forming a third dielectric layer on the plurality of first interconnection structures;
forming a plurality of third via holes through the third dielectric layer; and
forming a common electrode layer on the third dielectric layer, wherein the common electrode layer comprises a plurality of touch electrodes separated from each other, and each of the touch electrodes is connected to a touch electrode line via a second via hole and a third via hole.

13. The method for forming a touch display panel structure according to claim 12, wherein the forming process of the scan lines and the touch electrode lines comprises:
depositing a first conductive material layer on the substrate;
forming a first photoresist layer on the first conductive material layer;
providing a first mask with a pattern, exposing the first photoresist layer through the first mask to form the pattern in the first photoresist layer, wherein a part of the first conductive material layer is uncovered owing to the pattern in the first photoresist layer; and
taking the first photoresist layer with the formed pattern as an etching mask, etching and removing the uncovered part of the first conductive material layer, forming the scan lines and the touch electrode lines by the remaining part of the first conductive material layer.

14. The method for forming a touch display panel structure according to claim 12, wherein a plurality of conductive underlays are further formed in a same layer as the first interconnection structures in the forming process of the first interconnection structures, the conductive underlay is deposited on the touch electrode line via the second via hole.

15. The method for forming a touch display panel structure according to claim 12, wherein the forming process of the first interconnection structures further comprises forming a pixel electrode array in a same layer as the first interconnection structures.

16. The method for forming a touch display panel structure according to claim 15, wherein the process of forming a pixel electrode array in a same layer as the first interconnection structures comprises:
    forming a second conductive material layer on the second dielectric layer;
    forming a second photoresist layer on the second conductive material layer;
    providing a second mask with a pattern, exposing the second photoresist layer through the second mask to form the pattern in the second photoresist layer, wherein a part of the second conductive material layer is uncovered owing to the pattern in the second photoresist layer; and
    taking the second photoresist layer with the formed pattern as an etching mask, etching and removing the uncovered part of the second conductive material layer, forming the first interconnection structures and the pixel electrode array by the remaining part of the second conductive material layer.

17. The method for forming a touch display panel structure according to claim 12, wherein the forming process of the common electrode layer on the third dielectric layer further comprises: forming a pixel electrode array in a same layer as the common electrode layer.

18. The method for forming a touch display panel structure according to claim 12, further comprising:
    forming an organic layer on the second dielectric layer after forming the second dielectric layer on the plurality of data lines; and
    forming a plurality of first via holes and a plurality of second via holes through the first dielectric layer, the second dielectric layer and the organic layer.

\* \* \* \* \*